(No Model.)
J. G. FALCON.
BALL AND SOCKET JOINT.
No. 497,373.                     Patented May 16, 1893.
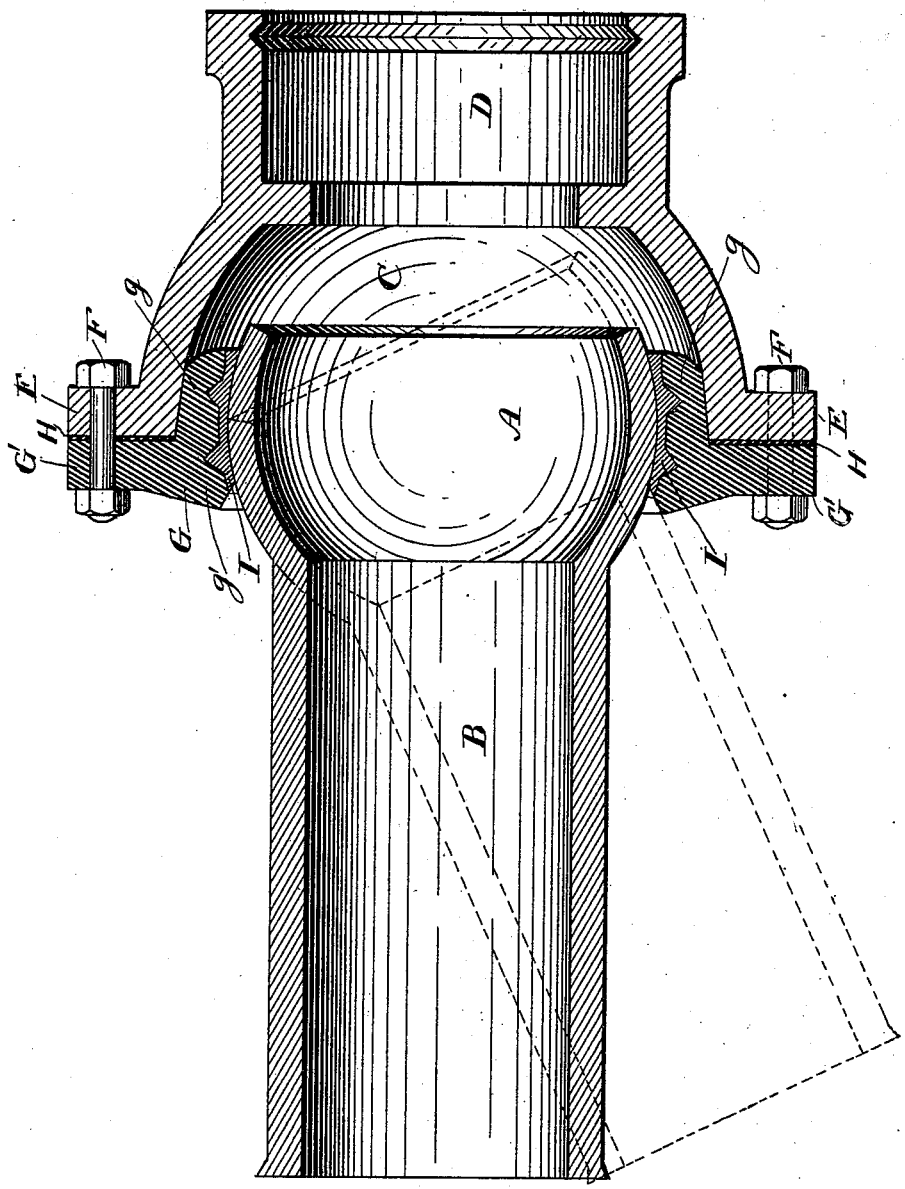
Witnesses:
J. Halpenny
Randell N. Burns
Inventor:
Joseph G. Falcon,
By his attorneys,
Gridley & Hopkins

UNITED STATES PATENT OFFICE.

JOSEPH G. FALCON, OF EVANSTON, ILLINOIS.

BALL-AND-SOCKET JOINT.

SPECIFICATION forming part of Letters Patent No. 497,373, dated May 16, 1893.

Application filed October 20, 1892. Serial No. 449,490. (No model.)

*To all whom it may concern:*

Be it known that I, JOSEPH G. FALCON, a citizen of the United States, residing at Evanston, in the county of Cook and State of Illinois, have invented certain new and useful Improvements in Ball-and-Socket Joints, of which the following is a specification, reference being had to the accompanying drawing, which is made a part hereof, and which shows in axial section a ball-and-socket joint embodying the invention.

Heretofore, it has been customary to form the socket of two parts of a hollow sphere, having at their meeting margins external flanges, through which pass the bolts by which they are secured together, the parts being of such size and so related that their inner surfaces occupy the same spherical plane. With such a socket, the inner surfaces of both of its parts, have contact with, and help to form, the bearing for the exterior spherical surface of the ball, but according to the present invention, the bearing is formed entirely upon a single part.

I will first describe the improved joint in detail, and then particularly point out in the claims the particular novel features which constitute the present invention.

The drawing shows the joint applied to two pieces of pipe, but it is equally applicable to solid rods, or other mechanical elements, and hence, the invention is not limited in this respect.

A represents the ball, which may be either secured to, or formed with, the part B, and C represents the socket, which may be either secured to, or formed with, the part D. The socket is, of course, open, and flares outward, it being of greatest internal diameter at its mouth, where it is provided on its exterior, with a radial flange, E, perforated at intervals for passage of the bolts F.

G is a ring, one end, $g$, of which is tapered on its exterior, so as to be complementary to the internal flaring surface of the socket C, and G' is a flange on the exterior of said ring, said flange being perforated, similarly to the flange E, for the passage of the bolts F. By tightening the nuts on these bolts, the tapering ring is forced into the flaring socket and the complementary surface of the two parts are forced into very close contact, making a tight joint, and, as an additional safe-guard against leakage, packing H is placed between the meeting surfaces of the flanges E and G'. The inner surface of the ring G is spherical, but of somewhat greater radius than the ball A, and the ring is of greater internal diameter at one end than it is at the other, and of greatest internal diameter at a point between the ends. At its inner end, $g$, it is of slightly greater, and at its outer end, $g'$, of less diameter than the axial diameter of the ball, so that in assembling the parts, the ball is inserted from the end $g$, and when the ball and ring are brought to such relative positions that their adjacent surfaces are practically concentric, the ring surrounding the ball in a diametrical plane, the space between them is filled with a packing I, of lead, or other suitable material. The packing is run in from the outer end of the ring a little at a time, and calked or tamped, so as to make it compact and expel air bubbles. If the joint becomes loose, it may be calked from the outside, without removing the ring, and in order to enable this, an annular space is left between the outer end of the ring and the ball. As commonly constructed the ring, at its outer end, fits close to the ball and must be disconnected from the socket for calking, and this is, of course, objectionable.

As between the old joint first above described and this new one, the latter is preferable, because, while both may contain the same amount of material, the latter is very much stronger. This is due to the fact that at the very point where the socket is most apt to break, the new socket has a double thickness and double quantity of metal. The parts are so proportioned that when the joint is deflected to its utmost limit, as indicated by dotted lines, the extremity of the ball will not, in the least, obstruct the channel.

The ring is herein spoken of as surrounding the ball in a diametrical plane by which is meant a plane that passes through the geometrical center of the ball.

Having thus described my invention, what I claim as new therein, and desire to secure by Letters Patent, is—

1. In a joint, the combination with a ball, of a ring surrounding the ball in a diametrical plane and extending in both directions from said plane, packing between the ball and ring, and a socket in which the ring fits, substantially as set forth.

2. In a joint, the combination with a ball, of a ring surrounding the ball in a diametrical plane and extending in both directions from said plane, packing between the ball and ring, and a socket in which the ring fits, said ring being of less internal diameter at its ends than at an intermediate point, substantially as set forth.

3. In a joint, the combination with a ball, of a ring surrounding the ball in a diametrical plane and extending in both directions from said plane, said ring having a tapering exterior, a socket having a flaring mouth in which the tapering ring fits, and means for forcing the ring and socket together and securing them, substantially as set forth.

4. In a joint, the combination with a ball, of a ring surrounding the ball in a diametrical plane and extending in both directions from said plane, said ring being of less internal diameter at its ends than at an intermediate point and having a tapering exterior, packing between the ring and ball, a socket having a flaring mouth in which the tapering ring fits, and means for forcing the ring into the socket and securing them together, substantially as set forth.

5. In a joint, the combination with a ball, of a ring surrounding the ball in a diametrical plane and extending in both directions from said plane, said ring having a tapering exterior and a radial external flange, a socket having a flaring mouth in which the tapering portion of the ring fits, and having a radial external flange, and means securing said flanges together the ring being of less internal diameter at its ends than at an intermediate point, substantially as set forth.

6. In a joint, the combination with the ball, of the ring G, surrounding the ball in a diametrical plane and having its exterior tapered and provided with the flange G', the socket C having the flaring mouth in which the tapering ring fits and having the flange E, bolts securing said flanges together, and packing between the inner surface of the ring and outer surface of the ball, the ring being of less internal diameter at its ends than at an intermediate point, substantially as set forth.

JOSEPH G. FALCON.

Witnesses:
J. HALPENNY,
N. C. GRIDLEY.